Jan. 9, 1934.  F. R. ERBACH  1,942,689
DOMESTIC POWER UNIT
Filed Jan. 20, 1931  2 Sheets-Sheet 1

INVENTOR.
FREDERICK R. ERBACH
BY
ATTORNEY.

Jan. 9, 1934.  F. R. ERBACH  1,942,689
DOMESTIC POWER UNIT
Filed Jan. 20, 1931  2 Sheets-Sheet 2
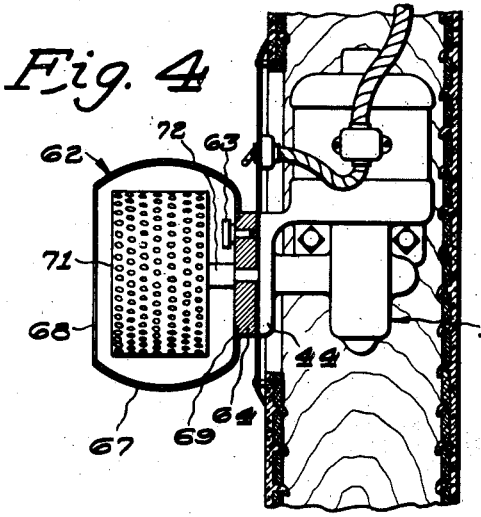
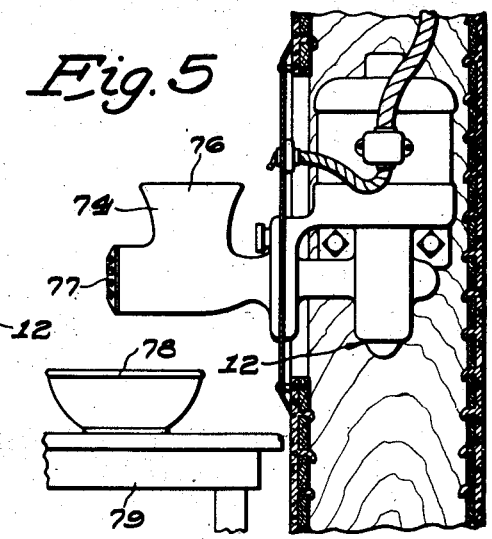
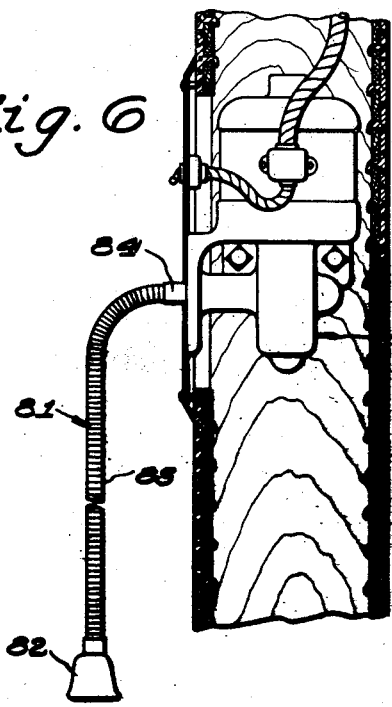
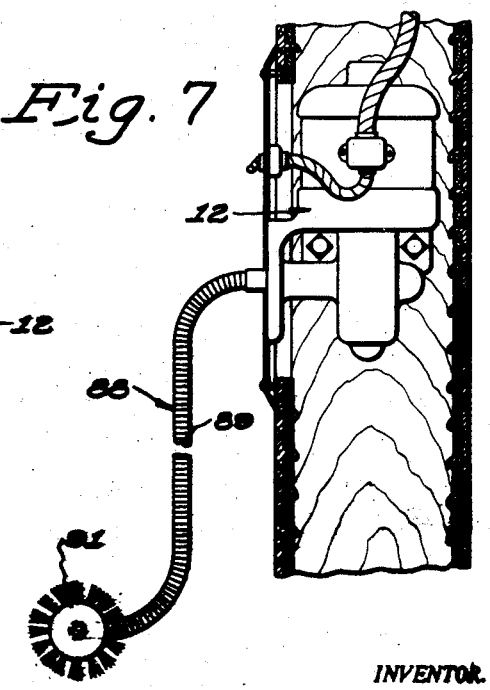
INVENTOR.
Frederick R. Erbach
BY
*Burch*
ATTORNEY.

Patented Jan. 9, 1934

1,942,689

UNITED STATES PATENT OFFICE 1,942,689

DOMESTIC POWER UNIT

Frederick R. Erbach, Detroit, Mich.

Application January 20, 1931. Serial No. 509,986

9 Claims. (Cl. 20—1.1)

This invention relates to household appliances and has particular relation to appliances having a permanently located power unit which may be employed in driving any number of useful household devices.

An object of the invention is to provide a power unit which is capable of being installed in the interior of a wall of a house or other building where it cannot be seen regardless of whether it is or is not being used.

A further object of the invention is to provide a power unit for driving household appliances which does not have to be gotten out of some closet or other place where household appliances heretofore have been kept, and put together and assembled before it can be employed for the purpose for which it is intended.

Still another object of the invention is to provide a power appliance which can be employed in operating any number of household appliances merely by attaching them whenever required to a driving connection of the unit.

The invention consists generally of a coupling which is located behind a face plate secured over some opening in the wall of a building and to which coupling the numerous appliances employed in a household, or elsewhere, may be attached. The coupling is positively driven by a motor also located behind the face plate in the opening in the wall. Speed reduction mechanism is employed between the motor and coupling when required by the service for which the unit is intended.

In the present instance a plurality of driving couplings are employed with a single motor in order that the unit may have a relatively wide range of applicability.

For a better understanding of the invention reference may now be had to the accompanying drawings forming a part of this specification, in which:

Figures 4, 5, 6 and 7 are fragmentary transverse cross sectional views of walls having the power unit embracing the principles of this invention located internally thereof and to which is attached a plurality of different household appliances whose utility is now generally recognized.

Figures 1, 2:
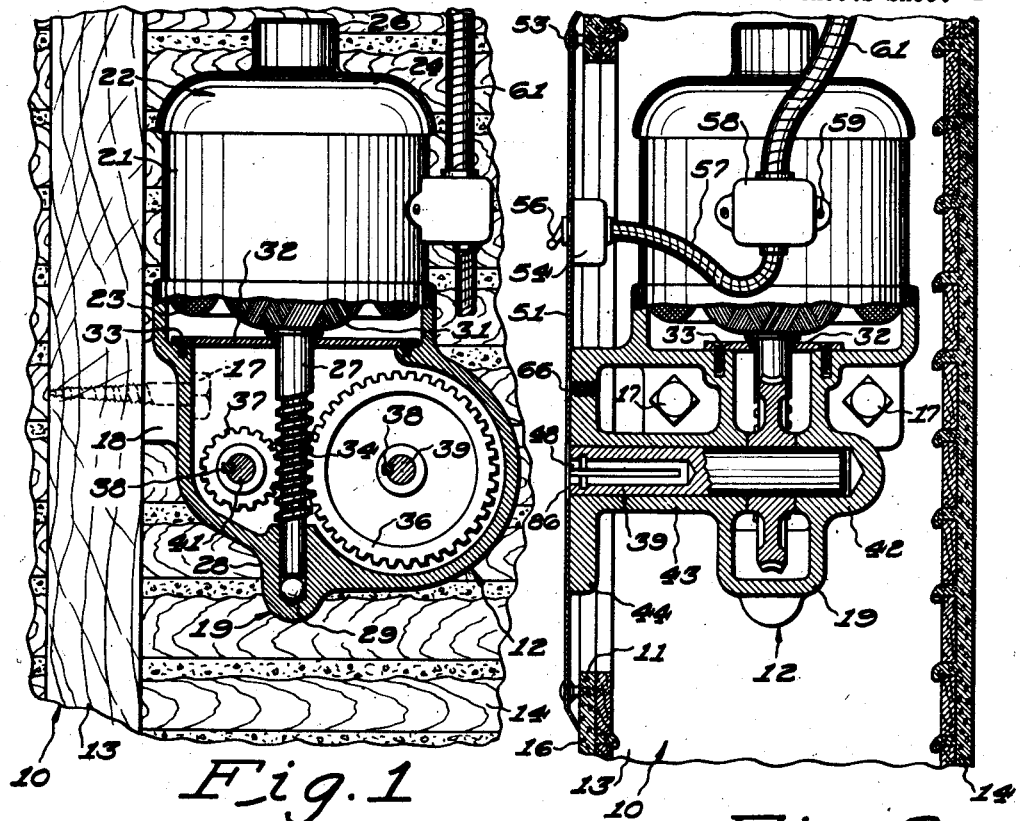
Figure 1 is a longitudinal cross sectional view of a wall of a buliding illustrating partly in cross section and partly in elevation a power unit in which the principles of this invention are embodied.
Figure 2 is a transverse cross sectional view of a wall of a building illustrating partly in cross section and partly in elevation the power unit and driving coupling embraced in the structure disclosed by Figure 1.
Figure 3:
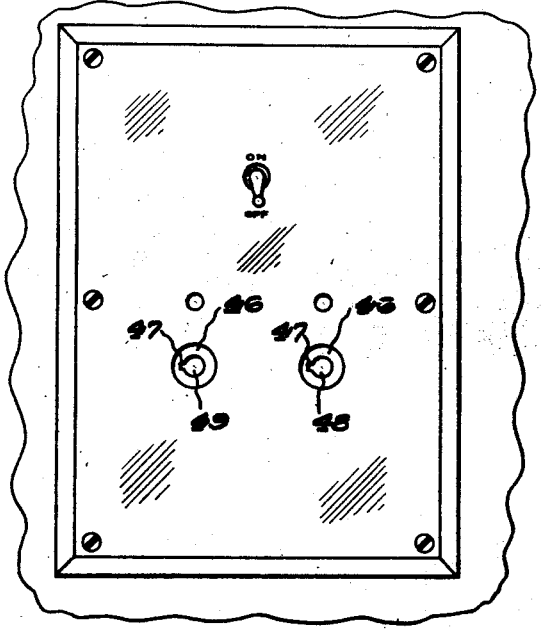
Figure 3 is a fragmentary view of a wall having the power unit as illustrated by Figures 1 and 2 located in the interior thereof.

In practising the invention a wall 10 is provided with an opening 11 through which a power unit 12 embodying the principles of the invention is inserted into the interior thereof.

The wall 10 which is illustrated in all of the figures of the drawings is one which is employed generally in wooden frame houses although the invention may be employed in walls of brick, stone, concrete or any other material in which a suitable opening may be formed.

The wall, as illustrated, consists of a plurality of vertically disposed studding 13 which are spaced along the interior thereof and which support on opposite and aligned surfaces thereof a lathe and plaster structure designated by the numerals 14 and 16. The unit 12 is rigidly secured to one of the studding 13 by a wood screw 17 which is anchored therein through an opening formed in a boss 18 projecting from a casing 19 in which a portion of the unit is enclosed. The upper extremity of the casing 19 is circular in formation and is adapted to receive, and have secured rigidly internally thereof, the lower extremity of a circular casing 21 of an electric motor 22.

A stator 23 is rigidly supported immediately inside the motor casing 21 while the upper extremity of the latter has rigidly secured thereto an end housing 24 at the axis of which a motor bearing 26 is formed. The upper extremity of a motor shaft 27 is journaled in the bearing 24 while the lower extremity thereof projects downwardly into the casing 19 and is supported rotatably in a bearing 28 which is formed adjacent the lower extremity thereof. A ball 29 arranged in the bearing 28 beneath the lower extremity of the shaft 27 provides a thrust bearing for the latter.

A rotor 31, located interiorly of the stator 23, is rigidly secured around the upper end of the shaft 27 for the purpose of rotating the latter. Immediately beneath the motor 22 is a closure plate 32 through an opening in which the shaft 27 projects. The plate is employed for the purpose of separating the elements of the motor from the interior of the casing 19. The plate is secured around a flange formed internally of the casing 19 by screws 33 projecting in spaced relation to each other through the periphery of the plate into the flange.

The lower extremity of the shaft 27 is provided with a worm 34, which, in the present embodiment of the invention, meshes with a pair of reduction gears 36 and 37 which are rigidly mounted by keys 38 intermediate the opposite ends of a pair of parallel shafts 39 and 41. The gear 37 being smaller in diameter than the gear 36, it is apparent that the shaft 41 will be driven by the worm 34 at a higher rate of speed than the shaft 39 will be driven.

The ends of the shafts 39 and 41 on one side of the gears 36 and 37 are rotatably mounted in bearings 42 formed in one side of the casing 19, while in the opposite side thereof are formed other bearings 43 for rotatably supporting the opposite ends of the shafts 39 and 41. The bearings 43 terminate in a flange 44 which is formed as an integral part of the casing 19 and the ends of each of the shafts 39 and 41 are accessible from beyond the external surface of the flange.

Openings 46, having keyways 47, project inwardly from the ends of the shafts 39 and 41 adjacent the flange 44 and provide driving connections 48 and 49 for the shafts respectively.

A face plate 51 provided with openings, through which the driving connections 48 and 49 are accessible, is secured rigidly to the wall 16 surrounding the opening 11 by means of screws 53. The face plate 51 of course closes the opening 11 in the wall 10 and hence hides from view any of the parts of the unit 12 other than the driving connections 48 and 49.

The operation of the power unit 12 is controlled by a switch 54 which is supported inside the face plate 51 and is operated externally thereof by means of a small lever 56. The electrical conductors by which the switch 54 controls the operation of the motor 22 are located in the interior of a flexible conduit 57 which extends between the switch and a terminal box 58 secured on the casing 21 of the motor 22 by screws 59.

The power line connected with a source of electrical energy, not shown, also is contained in a flexible conduit indicated at 61 which is likewise connected at one end with the terminal box 59. When the lever 56 is actuated in one direction the motor 22 will be energized continuously to drive the shafts 39 and 41 until the lever is actuated in the opposite direction.

In Figure 4 the power unit 12 is employed in driving a clothes dryer 62 which is secured rigidly against a face plate 51 beyond the flange 44 by a screw 63 which projects through an opening in a support 64 for the dryer into a threaded opening 66 in the flange 44. The dryer 62 consists of a relatively cylindrically formed housing 67 having an opening 68 at one extremity thereof and having a flange 69 at the opposite extremity which is secured rigidly to the support 64. In the interior of the housing 67 is a perforated and cylindrical rotor 71 which is rigidly secured to and rotatably driven by a shaft 72 extending through the support 64 and into one of the driving couplings 48 or 49 depending upon at which speed it is desired to operate the rotor 71. The portion of the shaft 72 projecting internally of the driving coupling is provided with a key, not shown, which cooperates with the keyway 47 thereof in the operation of the dryer.

In Figure 5, a food chopper 74, of any well known character, is employed in combination with the power unit 12 and is secured to the face plate 51 against the flange 44 and driven by either of the driving couplings 48 and 49 in the same manner as the dryer 62 is secured and driven. Food introduced into the chopper at 76 will be discharged at 77 into a bowl or other suitable vessel 78 which is supported by a table 79 situated adjacent the wall 10.

Figure 6 illustrates the use of the power element for driving a mechanical vibrator or massaging appliance 81 which consists of a vibrating instrument 82, driven through a flexible conduit 83 by a rotating flexible shaft, not shown. The shaft has an end portion projecting beyond a collar 84 which is secured to the end of the flexible conduit 83 opposite to that adjacent the vibrating element 82. This end portion projects and is nonrotatably secured in either of the driving couplings 48 and 49 by a detent mechanism (not shown) which cooperates with the groove 86 formed inside the couplings (see Figure 2).

Figure 7 discloses a brushing, scrubbing and polishing attachment 88 consisting of a flexible driving connection 89 similar to that employed in the structure disclosed by Figure 6, and a rotatable brush 91 operatively secured at one end thereof. The driving element 89 may be long enough, if desired, so that the brush 91 will be available in any portion of a room for scrubbing and polishing floors, woodwork, etc., or for any other purpose desired.

It is to be understood that the invention is not limited to the use of the particular household appliances with which it has been illustrated herein, but it may be employed with numerous other household appliances now in general use or which may be conceived as a result of the use of this invention.

It is apparent also that the invention is not limited to the particular structure of the power unit disclosed herein but that numerous modifications and changes may be made therein within the spirit of the invention or the scope of the appended claims.

I claim:

1. The combination of a building wall having an opening formed therein, of a power unit rigidly secured within the opening, means for closing the opening to shield from view the power unit located internally of the wall, and a driving connection disposed behind said means and associated with the unit but accessible from the exterior of the wall.

2. The combination with the wall of a building having a cavity formed internally thereof, of a power unit rigidly secured in such cavity, a shield for the said power unit and closing said cavity, a driving connection associated with the power unit and located within said shield but accessible from the exterior of the wall for driving various household appliances, and means arranged on the outside of the shield for controlling the operation of the power unit located internally thereof.

3. The combination with a wall of a building having a cavity formed therein, of a power unit having a frame rigidly secured within the cavity, said power unit also having an internally disposed driving connection accessible from externally of said cavity, and means for rigidly securing a household appliance to the power unit frame.

4. The combination with a wall of a building having an opening extending internally from one side thereof, of a motor arranged within the opening and having a driving shaft confined within the limits of said opening but available externally thereof, a shield against said wall and over the opening for hiding the motor from view and means for detachably securing said motor unit parts to said wall.

5. The combination of an electric motor arranged in the interior of a wall of a building, of a pair of shafts associated with the motor and confined within but accessible from the exterior of the wall, and means associated with the shafts and the motor for driving the former at different speeds.

6. The combination with a wall of a building having an opening formed therein, of a shield for such opening for closing the latter from view from the region externally of said wall, a driving connection within said opening and behind said shield but accessible from externally of said wall through an opening formed in said shield, said driving connection being adapted for operating a plurality of household mechanical appliances, said appliances having means associated therewith for detachable engagement with said driving connection beyond said shield, and an electrical motor beyond said shield and operatively associated with said driving connection for selectively driving said household appliances therethrough.

7. The combination with a wall of a building having an opening formed therein and an inner surface exposed to a room partially formed thereby, of a shield for covering said opening and engaging said wall surface, said shield having a motor and a driving connection arranged on one side thereof for driving mechanical household appliances employed in said room on the opposite side of said shield, said appliances having driven connection for engagement with said driving connection thru an opening formed in the aforesaid shield.

8. The combination with the wall of a building, of an electric motor power unit rigidly secured to said wall, a shield secured to the wall for hiding the motor from view, a driving shaft behind said wall and associated with said motor, said driving shaft being adapted to drive a plurality of household mechanical appliances, and means for detachably and selectively securing said household mechanical appliances to said driving shaft.

9. The combination with the wall of a building, of an electric motor power unit secured to the wall for operation thereon, a driving connection projecting externally of said motor, said driving connection being adapted for driving a plurality of mechanical household appliances, means for detachably securing said mechanical household appliances to the driving connection for operation thereby, and a shield covering said driving connection but provided with an opening therein for rendering said connection accessible from the exterior of said wall.

FREDERICK R. ERBACH.